US012784582B2

(12) United States Patent
Iio

(10) Patent No.: US 12,784,582 B2
(45) Date of Patent: Nov. 3, 2026

(54) ESTIMATING TRAFFIC VOLUME USING SPATIOTEMPORAL POINT DATA

(71) Applicant: Kentaro Iio, Yao (JP)

(72) Inventor: Kentaro Iio, Yao (JP)

( * ) Notice: Subject to any disclaimer, the term of this patent is extended or adjusted under 35 U.S.C. 154(b) by 213 days.

(21) Appl. No.: 18/036,614

(22) PCT Filed: Nov. 12, 2021

(86) PCT No.: PCT/US2021/059234
§ 371 (c)(1),
(2) Date: May 11, 2023

(87) PCT Pub. No.: WO2022/104133
PCT Pub. Date: May 19, 2022

(65) Prior Publication Data

US 2023/0410645 A1 Dec. 21, 2023

Related U.S. Application Data

(60) Provisional application No. 63/112,937, filed on Nov. 12, 2020.

(51) Int. Cl.
*G08G 1/01* (2006.01)
*G08G 1/052* (2006.01)

(52) U.S. Cl.
CPC ......... *G08G 1/0141* (2013.01); *G08G 1/0108* (2013.01); *G08G 1/0129* (2013.01); *G08G 1/0133* (2013.01); *G08G 1/052* (2013.01)

(58) Field of Classification Search
CPC .. G08G 1/0141; G08G 1/0108; G08G 1/0129; G08G 1/0133; G08G 1/052;
(Continued)

(56) References Cited

U.S. PATENT DOCUMENTS 8,103,435 B2 1/2012 Yang et al.
8,660,789 B2 2/2014 Demiryurek et al.
(Continued)

FOREIGN PATENT DOCUMENTS

CN 104091047 A 10/2014
CN 103050005 B 6/2015
(Continued)

OTHER PUBLICATIONS

International Search Report and Written Opinion issued in International Application No. PCT/US21/59234, mailed Feb. 3, 2022, 11 pages.
(Continued)

*Primary Examiner* — Erin M Piateski
*Assistant Examiner* — Hajar Hassaniaedekani
(74) *Attorney, Agent, or Firm* — Talem IP Law, LLP

(57) ABSTRACT

As described herein, systems and methods for estimating traffic volume provide the ability to identify an area of interest in which to determine an estimated traffic volume, obtain point data associated with the area of interest, determine a concentration of the area of interest based on the point data, obtain one or more known volume-to-concentration ratios, and determine the estimated traffic volume for the area of interest based the concentration of the area of interest and the one or more known volume-to-concentration ratios. The point data includes at least spatiotemporal data and geographic information data. In some cases, the estimated traffic volume is provided to an end user. In some cases, at least one traffic element recommendation for the area of interest based on the estimated traffic volume can be determined and provided to an end user.

28 Claims, 8 Drawing Sheets

(58) Field of Classification Search
CPC ........ G08G 1/0116; G08G 1/04; G08G 1/065; G08G 1/0112; G08G 1/01; G08G 1/00; G08G 1/13
See application file for complete search history.

(56) References Cited

U.S. PATENT DOCUMENTS

| | | | | |
|---|---|---|---|---|
| 9,062,985 | B2 | 6/2015 | Demiryurek et al. | |
| 9,336,679 | B1 * | 5/2016 | Chitale | H04W 24/04 |
| 9,518,837 | B2 | 12/2016 | Fowe | |
| 9,558,661 | B2 | 1/2017 | Shi et al. | |
| 10,126,135 | B2 | 11/2018 | Mortazavi et al. | |
| 10,482,761 | B2 | 11/2019 | Dorum | |
| 10,580,292 | B2 | 3/2020 | Dorum | |
| 11,035,680 | B2 * | 6/2021 | Larroy | G01C 21/34 |
| 2008/0071465 | A1 * | 3/2008 | Chapman | G01C 21/3691 701/117 |
| 2010/0070175 | A1 | 3/2010 | Soulchin et al. | |
| 2012/0109506 | A1 * | 5/2012 | Fei | G08G 1/0116 701/118 |
| 2015/0120174 | A1 * | 4/2015 | Lewis | G08G 1/0129 701/118 |
| 2015/0363108 | A1 | 12/2015 | Kumar | |
| 2016/0189044 | A1 | 6/2016 | Pan et al. | |
| 2016/0379486 | A1 | 12/2016 | Taylor | |
| 2017/0076594 | A1 * | 3/2017 | Scofield | B60W 40/04 |
| 2019/0172344 | A1 | 6/2019 | Baik | |
| 2019/0325738 | A1 | 10/2019 | Dorum | |

FOREIGN PATENT DOCUMENTS

| | | | | |
|---|---|---|---|---|
| CN | 103247177 B | | 1/2016 | |
| CN | 106710208 A | | 5/2017 | |
| CN | 107516417 B | | 9/2019 | |
| CN | 111524367 A | * | 8/2020 | G08G 1/04 |
| KR | 101017767 B1 | | 2/2011 | |
| KR | 102083952 B1 | | 4/2020 | |
| WO | 2015099387 A1 | | 7/2015 | |

OTHER PUBLICATIONS

Shixiang Zhu et al. "Spatio-Temporal Point Processes with Attention for Traffic Congestion Event Modeling" May 15, 2020, 11 pages, arXiv:2005.08665v1.

Rui Dai et al. "Hybrid Spatio-Temporal Graph Convolutional Network: Improving Traffic Prediction with Navigation Data" Jun. 23, 2020, 9 pages, arXiv:2006.12715v1.

Peng Xie et al. "Urban flow prediction from spatiotemporal data using machine learning: A survey" Information Fusion, Jul. 2020, 12 pages, vol. 59.

Jack Snowdon et al. "Spatiotemporal Traic vol. Estimation Model Based on GPSSamples" GeoRich'18, Jun. 10, 2018, 6 pages.

Behrooz et al. "Short-Term Traffic Forecasting: Modeling and Learning Spatio-Temporal Relations in Transportation Networks Using Graph Neural Networks" Electrical Engineering and Computer Sciences University of California at Berkeley Technical Report No. UCB/EECS-2015-243, Dec. 17, 2015, 73 pages, http://www.eecs.berkeley.edu/Pubs/TechRpts/2015/EECS-2015-243.html.

Hongtai Yang et al. "A Kriging based spatiotemporal approach for traffic volume data imputation" PLOS ONE, Apr. 17, 2018, 11 pages, https://doi.org/10.1371/journal.pone.0195957.

Shih-Lung Shaw "Moving Toward Spatiotemporal GIS for Transportation Applications" Retrieved on May 11, 2013, 11 pages, Retrieved from: https://proceedings.esri.com/library/userconf/proc00/professional/papers/PAP205/p205.htm.

Richter, Felix et al., "Temporal and Spatial Clustering for a Parking Prediction Service," (Abstract), 2014 IEEE 26th International Conference on Tools with Artificial Intelligence, Nov. 2014, pp. 278-282 (1 page), IEEE, Limassol.

* cited by examiner

1000

1100

ESTIMATING TRAFFIC VOLUME USING SPATIOTEMPORAL POINT DATA

CROSS-REFERENCE TO RELATED APPLICATIONS

This application is the U.S. National Stage Application of International Application No. PCT/US21/59234, filed Nov. 12, 2021, which claims the benefit of U.S. Provisional Patent Application Ser. No. 63/112,937, filed Nov. 12, 2020, which are hereby incorporated by reference in their entirety.

BACKGROUND

Traffic volume is a fundamental variable of transportation in a motorized society. It not only indicates the level of traveler activity but also represents road users' exposure to a transportation system at an aggregated level. Depending on the purpose, vehicular traffic volume can be measured for different durations, such as hourly, daily, weekly, monthly, and yearly. Annual average daily traffic (AADT) is widely used to determine transportation planning and engineering solutions (including safety applications such as the calculation of crash rates), air pollution models, wildlife protection solutions, real estate valuations, and marketing solutions (e.g., determining the best position to place a billboard).

Traditionally, traffic volume estimation methods and systems include either automatically counting (with the installation of a temporary or permanent electronic traffic recording device), or manually by observers who visually count and record traffic on a hand-held electronic device or tally sheet. These traditional traffic volume estimation methods and systems are often accompanied by installation cost, maintenance cost as well as labor costs. Also, counts are only available at the locations of counting facilities, making it difficult and/or impossible to determine traffic volumes on-demand for a wide range of locations. Therefore, there is a need for low cost solutions for estimating traffic volume.

BRIEF SUMMARY

Systems and methods for estimating traffic volume are described. A traffic volume estimation system can determine an estimated traffic volume for an area of interest using relatively scant data and one or more known volume-to-concentration ratios. Estimated traffic volume can be leveraged to determine funding for maintenance and improvement of highways, operational assessment of transportation facilities, designing and planning of projects, investment prioritization, and policy decisions. Advantageously, government, urban planners, real estate, or commercial marketers do not have to manually count traffic and instead can use the described system and methods to provide end users with instant estimated traffic volume level and policy recommendations based on that estimated traffic volume at almost any location (e.g., anything from parking lots and theme parks to billboards and pollution solutions). Additionally, the described systems and methods can be applied to any situations in which objects pass through an area of interest.

As described herein, systems and methods for estimating traffic volume provide the ability to identify an area of interest in which to determine an estimated traffic volume, obtain point data associated with the area of interest, determine a concentration of the area of interest based on the point data, obtain one or more known volume-to-concentration ratios, and determine the estimated traffic volume for the area of interest based the concentration of the area of interest and the one or more known volume-to-concentration ratios. The point data includes at least spatiotemporal data and geographic information data.

In some cases, the estimated traffic volume is provided to an end user. In some cases, the described systems and methods further provide the ability to determine at least one traffic element recommendation for the area of interest based on the estimated traffic volume. In some cases, the described systems and methods further provide the ability to provide the at least one traffic element recommendation for the area of interest to an end user. In some cases, determining the concentration of the area of interest based on the point data includes determining, from the point associated with the area of interest, at least one of a variance, a standard deviation, a variance-to-mean ratio and a coefficient-of-variation, and determining an optimal cordon length within the identified area of interest based on a minimized value of the at least one of the variance, the standard deviation, the variance-to-mean ratio and the coefficient-of-variation. In some cases, identifying the area of interest includes receiving at least one of a user selection of the area of interest on a digital map and an algorithmic selection of an uninterrupted road segment.

In some cases, the at least one traffic element recommendation is at least one of a transportation engineering solution and a zoning recommendation. In some cases, determining the concentration for the area of interest based on the point data includes determining a summation of speeds recorded by a plurality of probes within the area of interest based on the point data. In some cases, determining the concentration for the area of interest based on the point data includes determining a speed distribution from moving speed data recorded by a plurality of probes within the area of interest based on the point data. In some cases, the point data further includes vehicle occupancy data.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
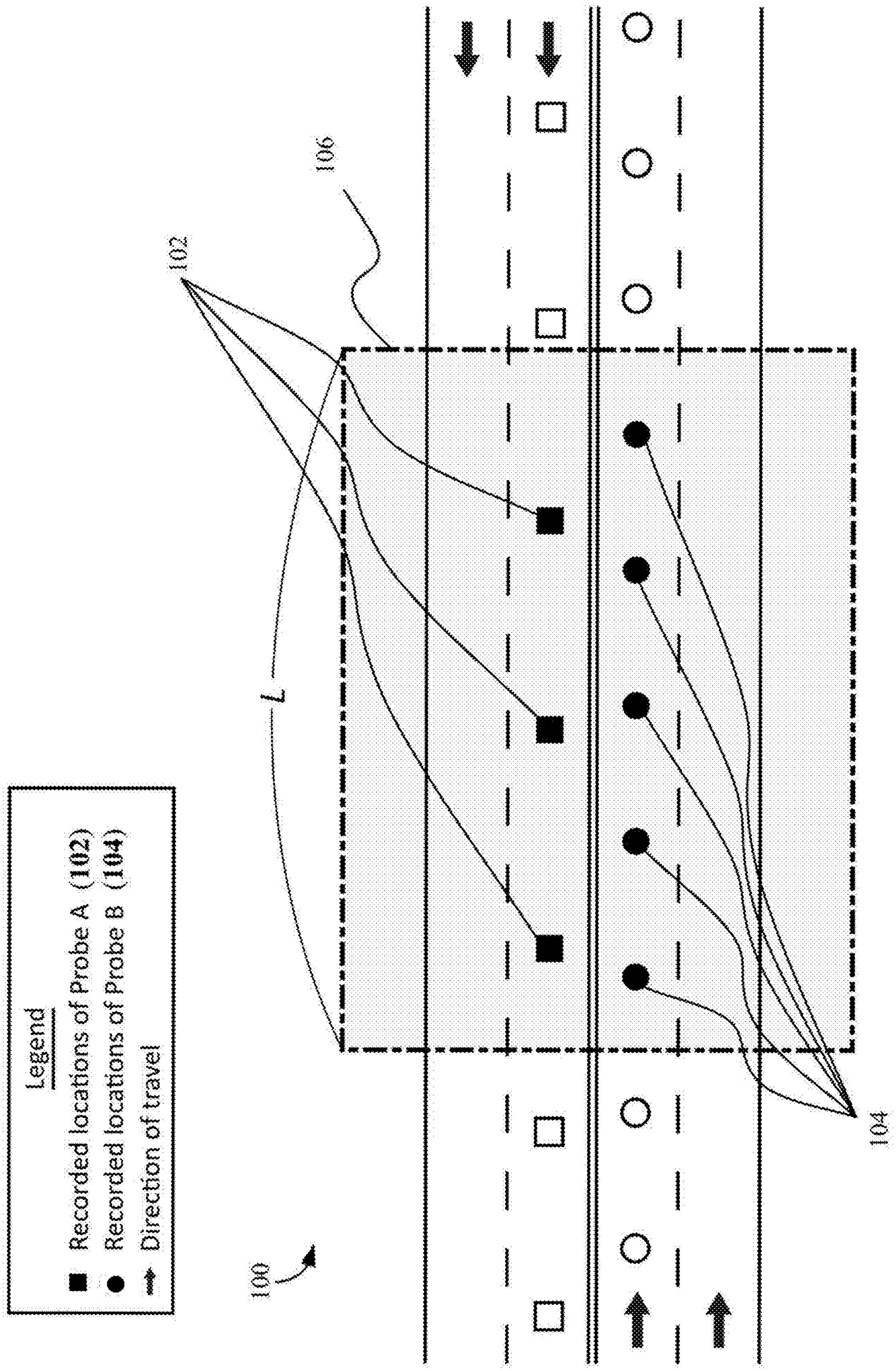
FIG. 1 illustrates a digital map with an area of interest having user point data recorded by a plurality of probes on a roadway.

Systems and methods for estimating traffic volume are described. A traffic volume estimation system can determine an estimated traffic volume for an area of interest using relatively scant data and one or more known volume-to-concentration ratios. Estimated traffic volume can be leveraged to determine funding for maintenance and improvement of highways, operational assessment of transportation facilities, designing and planning of projects, investment prioritization, and policy decisions. Advantageously, government, urban planners, real estate, or commercial marketers do not have to manually count traffic and instead can use the described system and methods to provide end users with instant estimated traffic volume level and policy recommendations based on that estimated traffic volume at almost any location (e.g., anything from parking lots and theme parks to billboards and pollution solutions). Additionally, the described systems and methods can be applied to any situations in which objects pass through an area of interest.

As used herein, a probe may refer to an object that is mobile (e.g., a user device and/or device that is attached within a moving object, such as a vehicle) or an object that is fixed (e.g., a camera, sensor, speed recorder and the like).

As used herein, a "road" refers to any surface which people can use, including, but not limited to, a highway, an interstate, a street, a parking lot, an avenue, a country road, etc.

It should be understood that while the systems and methods described herein generally refer to vehicular traffic volume, these same systems and methods can be applied to any situation in which objects pass through an area of interest.

The methods and systems described herein may utilize a non-analytic method or an analytic method to estimate traffic data and provide traffic element recommendations. The non-analytic method estimates distribution of concentration (e.g., the number of probes passing through an area of interest during a time period) and/or traffic volume by utilizing numerical simulations (e.g., Monte Carlo simulations). The analytic method estimates distribution of concentration and/or traffic volume analytically by utilizing convoluted beta distributions and/or the central limit theorem.

The methods and systems described herein perform traffic volume estimation based on point data without route reconstruction. Therefore, the methods and systems described herein are even applicable to point data of probes recorded at fixed, almost fixed, and/or random time intervals (e.g., GPS Exchange Format or GPX) that do not contain pseudonyms of probes. Advantageously, the described spatiotemporal data or the speed or velocity information can be anonymized (or "noised"/"masked") data, which is currently not considered as personal information in the EU's General Data Protection Regulation (GDPR) or California Consumer Privacy Act.

This specification uses the following notation to describe functions, variables, and results of calculations described herein:

$\kappa$=concentration $\nu$=the true vehicle volumes per unit time of the interest T=repetition of the unit time in an observation period $\eta$=probe penetration rate m=the number of probes traversing the segment in the observation period L=horizontal cordon length along the segment L'=horizontal cordon length along the surface $\tau$=recording interval per unit time s=space-mean speed or time-mean speed associated with records and/or probes $\tilde{n}=\lfloor L/s\tau \rfloor$ $a(\tilde{n})$=minimum speed corresponding to particular $\tilde{n}$ $b(\tilde{n})$=maximum speed corresponding to $\tilde{n}$ K=the number of successes in independent Bemoulli trials, where $0 \le K \le m$ E[X]=expected value of X Var[X]=variance of X B(x, y)=beta function g(s)=probability density function of s FIG. 1 illustrates a digital map with an area of interest having user point data recorded by a plurality of mobile probes on a roadway. Referring to FIG. 1, a digital map 100 includes a plurality of point data records 102 of Probe A and a plurality of point data records 104 of Probe B. These point data records 102, 104 are recorded within the identified within an area of interest 106 during a time period. Using the mobile probes, it is possible to identify a concentration. In this example, a length (L) represents a length of the area of interest (and may also be referred to as a cordon length). Here, Probe A and Probe B are located in moving objects. As can be seen, there are three point data records 102 of Probe A and five point data records 104 of Probe B. This may be, for example, because Probe A is travelling faster than Probe B (e.g., Probe B is traveling at 30 meters/second and Probe A is traveling at 20 meters/second), and therefore Probe B spends less time within the area of interest 106 than Probe A, assuming that both probes are transmitting point data at the same fixed time interval (e.g., every five seconds). In other words, Probe B may be traveling faster through the area of interest 106 than Probe A. In other cases, Probe B may transmit point data at a different time interval than Probe A, resulting in Probe B transmitting the fewer point data records than Probe A.

Each of the plurality of point data records 102, 104 can be recorded as point data at fixed intervals, almost fixed intervals, or random intervals. Each data point record includes at least spatiotemporal data (e.g., latitude, longitude and a time stamp) and geographic information data (e.g., topography data of the road). In some cases, each data point record may further include moving speed, and/or vehicle occupancy data. In some cases, moving speed may be determined by using a change in distance between two point data records (e.g., latitude, longitude, and topography changes along the road between two point data records) divided by the change in time between those two point data records (e.g., time stamp changes between the two point data records). This may be used in cases in which there is no moving speed data sent in point data records.

In the example of FIG. 1, note that there are a total of eight point data records 102, 104 from Probe A and Probe B in the area of interest 106. In some cases, the number of probes (e.g., two in this case) may not be known because pseudonyms tied to each probe may not be available, in which case each point data record from the moving probes would need to include moving speed. In any case, the concentration for the area of interest 106 for the non-analytic method is computed by a summation of the moving speeds associated with each point data record 102, 104. This summation representing a concentration can be computed by the equation:

$$\kappa_{observed}=\sum_{i=1}^{n} s_i$$

where n is the number of point data records from probes associated with space-mean speed or time-mean speed $s_i$. Therefore, if the point data records 102 for Probe A include (or are computed to be) 20 meters/second and the point data records 104 for Probe B include (or are computed to be) 30 meters/second, the concentration for the area of interest 106 is 190 (e.g., 20+20+20+20+20+30+30+30=190). An example is presented below with respect to FIG. 5.

For the analytical method, the concentration of the area of interest 106 is computed by determining a speed distribution (e.g., continuous or discrete), as is described in more detail below. The difference between the two methods is countability. The non-analytic method uses discrete addition of the moving speeds of the point data, which are countable, while the analytic method uses the probability mass function and/or probability density function of speed (e.g., as illustrated below with respect to FIG. 11), which may not be countable.

Assuming that the probes are each transmitting point data records at the same fixed time interval and/or account for variability in the time interval, the probability that a user's point data record is transmitted within an area of interest is inversely proportional to the driving speed when the location data is recorded within the area of interest. For example, where a first user is driving at 60 mph and a second user is driving 30 mph, the second user's point data record is twice more likely to get recorded within the area of interest because the second user is moving at half the speed of the first user. This means the sum of recorded speeds within an area of interest (i.e., concentration) is proportional to real traffic volume that traversed the area of interest when enough observations are made. When a concentration and a true traffic count are known at one location, the traffic volume of a second location can be estimated by calculating a volume-to-concentration ratio, and then applying the volume-to-concentration ratio to a concentration of the second location.

As a specific example of determining an estimated traffic volume for the area of interest during a time period, the concentration (e.g., $\kappa_{observed}$) is the best estimate of concentration given a series of $s_i$. The expected number of records from a probe given a length (L) of the area of interest 106 and recording interval $\tau$ is $L/s_i\tau$. Therefore, the expected concentration from a probe is $L/\tau$. When the true traffic volume, which may be unknown, in a timeframe T is equal to $\nu$ and the probe penetration rate among the population is $\eta$, the expected concentration from the probes is:

$$E[\kappa_{expected}]=E[\kappa_{observed}]=\frac{\eta\nu TL}{\tau}$$

where $\eta\nu T$ indicates the true number of probes passing through the area of interest 106 during a time period.

It should be noted that this equation may yield a non-integer, but the actual number of records in a non-negative integer (e.g., it is impossible to observe 3.33 point data records). For example, when L=100, $s_i$=30, and $\tau$=1, the expected number of point data records is $$\frac{100}{30\times 1}\approx 3.333;$$

therefore, three or four records will be observed when this probe traverses the area of interest 106. In other words, the minimum number of records A from the probe is $$\left\lfloor\frac{100}{30\times 1}\right\rfloor=3.$$

In this condition, another record is observed at the probability of $$\left(\frac{100}{30\times 1}\bmod 1\right)\approx 0.333,$$

which can be considered as a Bemoulli trial with the success rate of $$\frac{100}{30\times 1}$$

mod 1. Therefore, the total number of records is ñ+K. When another record is not observed, K=0; whereas K=1 when another record is observed. Because concentration is the sum of moving speed, the variance of concentration is a partial sum of a series of speed-weighted Bemoulli trials with different success rates $P_i$.

Using this approach, because $\eta\nu T$ indicates the true number of probes traversing the area of interest 106 in the time period T, the expected concentration $\kappa_{expected}$ is proportional to true traffic volume $\nu$. Using the described non-analytical and/or analytical methods described below, the systems and methods described herein provide the ability to output (e.g., numerically and/or graphically) expected concentration/estimated traffic volume, variance and/or standard deviation of expected concentration/estimated traffic volume, coefficient of variation of expected concentration/estimated traffic volume, distribution of expected concentration/estimated traffic volume, confidence intervals of expected concentration/estimated traffic volume, and/or optimal length (L) of the area of interest/cordon, as well as additional statistics about the distribution (e.g., percentile values, kurtosis, and/or skewness) of expected concentration/estimated traffic volume. This information can be used to provide a recommendation for solving a transportation engineering solution and/or a zoning problem.

As described in detail below, using the non-analytical and/or analytical methods described below to estimate the traffic volume of any given area of interest, the probe penetration rate $\eta$ can be estimated. For example, when an area of interest has a known AADT, the equation $$E[\kappa_{expected}] = E[\kappa_{observed}] = \frac{\eta v T L}{\tau}$$

can used to solve for the probe penetration rate η. By repeating this procedure at all locations that have known traffic volumes, one can map penetration rates over the surface of the earth or facilities (e.g., a kernel density map or heat map) electronically. When the density of penetration rate q is computed, it is possible to estimate true traffic volume v (e.g., using the analytical and/or non-analytical methods) because v is the only unknown variable in the equations.

Figure 2:
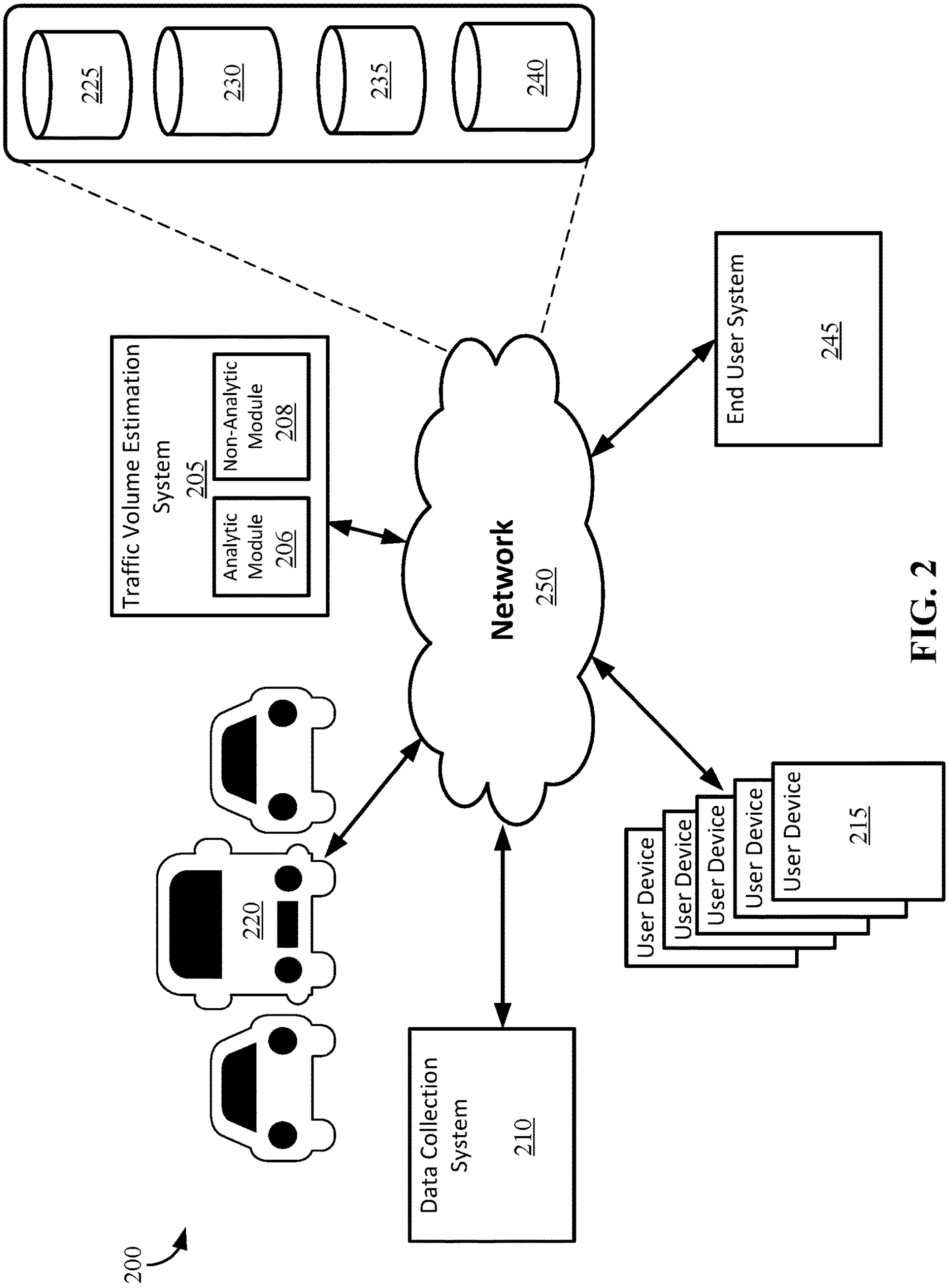
FIG. 2 illustrates an example operating environment for estimating traffic volume using spatiotemporal point data according to an embodiment of the invention.

FIG. 2 illustrates an example operating environment for estimating traffic volume using spatiotemporal point data according to an embodiment of the invention. Referring to FIG. 2, communications between a traffic volume estimation system 205, a data collection system 210, a plurality of computing devices (e.g., computing device 215 and computing device 220), a plurality of data resources (e.g., data resource 225, data resource 230, data resource 235, and data resource 240), and an end user system 245 may occur over a network 250.

The data collection system 210 collects point data at fixed intervals, almost fixed intervals, or random intervals. The data collection system 210 can include or communicate with one or more of the plurality of data resources. The data collection system 210 may be any suitable data collection system. In some cases, the data collection system 210 may be a third-party data collection and preparation system. For example, the data collection system 210 may provide a specialized application that collects at least spatiotemporal data (when the user has opted to allow for such location tracking).

The plurality of computing devices (e.g., computing device 215 and computing device 220) may be, but are not limited to, a personal computer, a laptop computer, a desktop computer, a tablet computer, a reader, a mobile device, a personal digital assistant, a smart phone, a gaming device or console, a wearable computer, a wearable computer with an optical head-mounted display, smart watch, a smart television, an on-board device (OBD), or a vehicle.

One or more of the plurality of computing devices may be a computing device integrated within a vehicle (e.g., computing device 220). One or more of the plurality of computing devices may be a device, such as a mobile device, of a driver or a passenger of a vehicle (e.g., computing device 215). The plurality of computing devices can include location-enabled devices or are able to retrieve geographic coordinates of a location. Indeed, the plurality of computing devices may be configured to collect and transmit at least spatiotemporal data (when the user has opted to allow for such location tracking). In some cases, one or more of the plurality of computing devices may be running a specialized application that collects at least spatiotemporal data. In some cases, the specialized application maybe managed by the data collection system 210.

Data resource 225 can comprise at least geocoded point data, such as spatiotemporal point data. Spatiotemporal data includes data that can identify spatiotemporal locations (points, including vertices of line data or areas) of moving objects, regardless of the geometry of the area. For example, spatiotemporal data can include latitude and longitude (regardless of method of notation) and time or range of time (e.g., "11/02/2020 22:37:05 GMT" or "November 2020" regardless of the resolution or forms of notation). In some cases, the data resource 225 can comprise speed or velocity information associated with moving objects traversing areas of interest. In some cases, the speed or velocity information can be recorded by one of the plurality of computing devices, such as a mobile device, OBD, or vehicles. In some cases, the speed or velocity information can be calculated by any suitable method. For example, the speed may be calculated using the distance and time between two points. In some cases, the speed or velocity information can also be speed information that is not recorded by such computing devices (e.g., posted speed limits, speed recorded through speed guns). For example, speed or velocity information includes, but is not limited to, average speed, mean speed, 15th percentile speed, median speed, 85th percentile speed, operating speed, pace speed distribution, estimated speed, and speed limits.

The point data can be collected through a variety of channels and in a number of ways. For example, the spatiotemporal data and/or the speed or velocity information can be collected from the plurality of devices (e.g., the computing device 215 and the computing device 220) at a fixed interval, an almost fixed interval, or a random interval. In some cases, the spatiotemporal data and/or the speed or velocity information can be collected from the plurality of devices (e.g., the computing device 215 and the computing device 220) and stored in the data resource 225 by the traffic volume estimation system 205. In some cases, the spatiotemporal data and/or the speed or velocity information can be collected from the plurality of devices (e.g., the computing device 215 and the computing device 220) and stored in the data resource 225 by the data collection system 210.

Data resource 230 can comprise geographical information. The geographical information includes, for example, a highway map, highway facility shapefiles or equivalent, a list of highways or roadways, a highway database that can be tabulated in Structured Query Language (SQL), and a graph data that represent highway networks.

Data resource 235 can comprise vehicle occupancy data (e.g., the number of probes per vehicle). The vehicle occupancy data can include a vehicle occupancy rate. The vehicle occupancy rate may be a function of time and location. In some cases, the vehicle occupancy rate is an estimation. As an example, during morning peak hours, the vehicle occupancy rate may be lower in comparison to vehicle occupancy rates during other times of the day because morning commuters tend to be single occupants.

Data resource 240 comprises known volume-to-concentration ratio data at different spatiotemporal locations. The volume-to-concentration ratio data stored in data resource 240 includes volume-to-concentration ratio data based on known traffic volumes.

In some cases, the known traffic volumes obtained from any suitable base count and may be provided by a third-party performing traffic counting, such as the Department of Transportation. In some cases, the known traffic volumes include point data from short-term counts, such as 24 or 48 hour pneumatic tube counts multiplied by seasonal factors. In some cases, the known traffic volumes include point data from videos performing traffic counting. In some cases, additional data from one of the data resources 225, 230, 235, 240 or another data resource may also be obtained. This additional data may include, but is not limited to, calibration factors as well as other data that can be used to estimate the traffic volume at an area of interest or provide data relevant to determine at least one traffic element recommendation. For example, at least one of the variance, the standard deviation, the variance-to-mean ratio and the coefficient-of-variation can also be used to calibrate volume-to-concentration ratios.

The traffic volume estimation system 205 can identify an area of interest in which an estimated traffic volume is to be determined. The area of interest may be a portion (e.g., a segment or a cordon) of a road in which a traffic volume estimation is desired (see, for example the area of interest 106 of FIG. 1). The traffic volume estimation system 205 can obtain point data associated with the area of interest. The point data associated with the area of interest can include at least spatiotemporal data and geographic information data. In some cases, the point data associated with the area of interest includes vehicle occupancy data. The traffic volume estimation system 205 can include or communicate with one or more of the plurality of data resources. The traffic volume estimation system 205 can obtain the point data from one or more of the plurality of computing devices, data resource 225, data resource 230, data resource 235, or the data collection system 210.

The traffic volume estimation system 205 can determine a concentration of the area of interest based on the obtained point data. In some cases, the concentration of the area of interest can be determined using an analytical method or non-analytical method. These analytical and non-analytical methods may include weighting data points in the area of interest by speed by any suitable method, including machine learning, artificial intelligence, and neural networks. In some cases, the concentration of the area of interest can be determined by multiplying data points in the area of interest by speed, a reciprocal of segment length (i.e., the length of the segment of the road of the area of interest), and a reciprocal of the vehicle occupancy rate. By using vehicle occupancy rate as a denominator, counting bias can be reduced (e.g., the number of recorded point data may be small during morning peak hours in comparison to other times of the day, but it is known that morning commuters tend to be single occupants in the United States).

The traffic volume estimation system 205 can obtain one or more known volume-to-concentration ratios. The one or more known volume-to-concentration ratios can be ratios for different spatiotemporal locations. For example, the traffic volume estimation system 205 can obtain one or more known volume-to-concentration ratios for a plurality of different locations. The traffic volume estimation system 205 can obtain the one or more known volume-to-concentration ratios from the data resource 240.

The traffic volume estimation system 205 can determine an estimated traffic volume for the area of interest based the concentration of the area of interest and the one or more known volume-to-concentration ratios. The traffic volume estimation system 205 can explicitly or inexplicitly multiply the concentration of the area of interest by the volume-to-concentration ratio to determine the estimated traffic volume for the area of interest.

As an illustrative example, an area of interest has a concentration of 50. If the volume-to-concentration ratio of a known location (e.g., the second location) is 1000/200, then the estimated traffic volume for the area of interest can be determined by multiplying the concentration (50) by the volume-to-concentration ratio (1000/200). Thus, the estimated traffic volume for the area of interest is 250.

The traffic volume estimation system 205 can determine the estimated traffic volume for the area of interest using one or both of an analytic module 206 (which implements an analytic method as described herein) and a non-analytic module 208 (which implements a non-analytic method as described herein).

The traffic volume estimation system 205 can provide the estimated traffic volume. The estimated traffic volume can be provided to the end user system 245. The end user system 245 may be, but is not limited to, a governmental agency system, an urban planning system, a real estate system, or a commercial marketer system. In some cases, the end user system 245 may be a user and receive the estimated traffic volume via a message (e.g., email, text, etc.). In some cases, providing the estimated traffic volume to the end user system 245 may simply be providing a communication to a monitor to display the estimated traffic volume (e.g., numerically and/or graphically). In some cases, the end user system 245 may be located at a remote device and the receipt of the estimated traffic volume is received over the network 250. In some cases, the end user system 245 may be located at the traffic volume estimation system 205. In this case, the estimated traffic volume may be provided to the end user system 245 where the estimated traffic volume is output to a display.

In some cases, in lieu of or in addition to providing the estimated traffic volume, the traffic volume estimation system 205 can determine at least one traffic element recommendation for the area of interest. In some cases, the at least one traffic element recommendation is at least one of a transportation engineering solution and a zoning recommendation. For example, the traffic volume estimation system 205 may be managed by an entity (e.g., a governmental agency system, an urban planning system, a real estate system, or a commercial marketer system) that uses the determined estimated traffic volume to recommend at least one traffic element recommendation for the area of interest. As a specific example, the entity may want to place a billboard within an area of interest only if the estimated traffic volume in that area of interest is above X vehicles per day. Therefore, the entity could use the described methods and systems to make that determination (e.g., whether to place the billboard in the area of interest based on the estimated traffic volume). In some cases, that determination is made by the traffic volume estimation system 205. In some cases, the solution depends upon the estimated traffic volume and may also take into account other factors (e.g., cost, time, estimated impact to the estimated traffic volume of a project, etc.) associated with the solution. As a specific example, the construction of an office building may increase traffic flow along a road. A governmental agency could determine a financial impact of approving the construction that includes options such as stops signs, a traffic control signal (e.g., a traffic light), a roundabout or traffic circle, and/or expansion of the road (as well as the upkeep costs associated with these options), which may be offset by the increased tax revenue from the addition of the office building. Therefore, each option in the solution may be weighted and, along with the estimated traffic volume, used by the traffic volume estimation system 205 to determine a recommendation of any particular solution (e.g., with or without certain options). For example, the traffic volume estimation system 205 could determine that, based on the weighted factors, the construction of the office building should include a roundabout to handle the estimated traffic volume (which the stop signs may not adequately handle but is less expensive than the increased cost for a traffic control signal).

In some cases, the traffic volume estimation system 205 can provide the at least one traffic element recommendation for the area of interest to the end user system 245. For example, the end user system 245 may be a third-party governmental agency system, an urban planning system, a real estate system, or a commercial marketer system may request a recommendation about a specific solution(s) to a problem and then the system 200 could perform traffic volume estimation described above.

In some cases, one or more of the traffic volume estimation system 205, the data collection system 210, the data resources 225, 230, 235, and 240, and the end user system 245, may be managed by a same entity.

Figure 4:
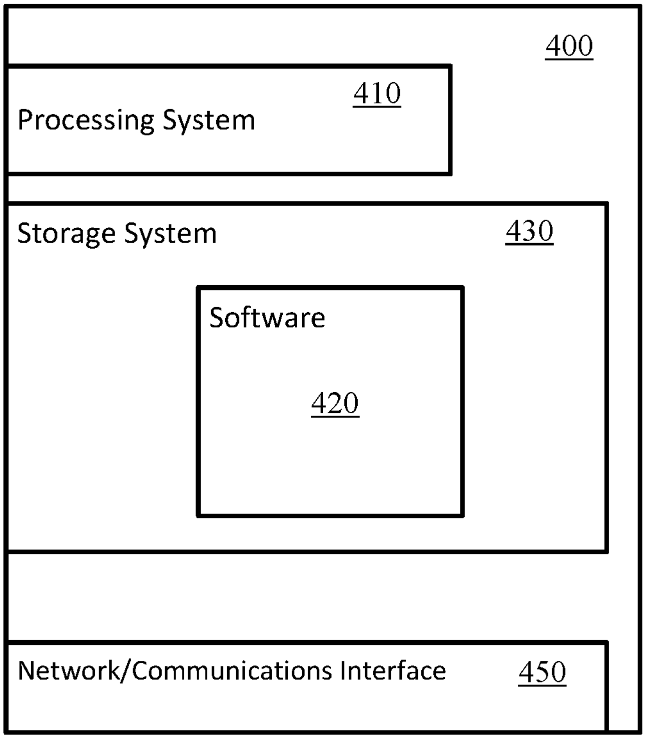
FIG. 4 illustrates components of an example computing system that may be used to implement certain methods and services described herein.

The traffic volume estimation system 205 may be implemented as software or hardware (or a combination thereof) on a server (e.g., a traffic volume estimation server), which may be an instantiation of system 400 as described in FIG. 4. In some cases, some or all of the features carried out by the traffic volume estimation system 205 are carried out at the data collection system 210 and/or the end user system 245.

Components (computing systems, storage resources, and the like of the traffic volume estimation system 205, the data collection system 210, the plurality of devices, the plurality of data resources, and the end user system 245) in the example implementation may operate on or in communication with each other over a network 250. The network 250 can be, but is not limited to, a cellular network (e.g., wireless phone), a point-to-point dial up connection, a satellite network, the Internet, a local area network (LAN), a wide area network (WAN), a Wi-Fi network, an ad hoc network or a combination thereof. Such networks are widely used to connect various types of network elements, such as hubs, bridges, routers, switches, servers, and gateways. The network 250 may include one or more connected networks (e.g., a multi-network environment) including public networks, such as the Internet, and/or private networks such as a secure enterprise private network. Access to the network 250 may be provided via one or more wired or wireless access networks as will be understood by those skilled in the art.

As will also be appreciated by those skilled in the art, communication networks can take several different forms and can use several different communication protocols. Certain embodiments of the invention can be practiced in distributed-computing environments where tasks are performed by remote-processing devices that are linked through a network. In a distributed-computing environment, program modules can be located in both local and remote computer-readable storage media.

Communication to and from the components may be carried out, in some cases, via application programming interfaces (APIs). An API is an interface implemented by a program code component or hardware component (hereinafter "API-implementing component") that allows a different program code component or hardware component (hereinafter "API-calling component") to access and use one or more functions, methods, procedures, data structures, classes, and/or other services provided by the API-implementing component. An API can define one or more parameters that are passed between the API-calling component and the API-implementing component. The API is generally a set of programming instructions and standards for enabling two or more applications to communicate with each other and is commonly implemented over the Internet as a set of Hypertext Transfer Protocol (HTTP) request messages and a specified format or structure for response messages according to a REST (Representational state transfer) or SOAP (Simple Object Access Protocol) architecture.

Figure 3:
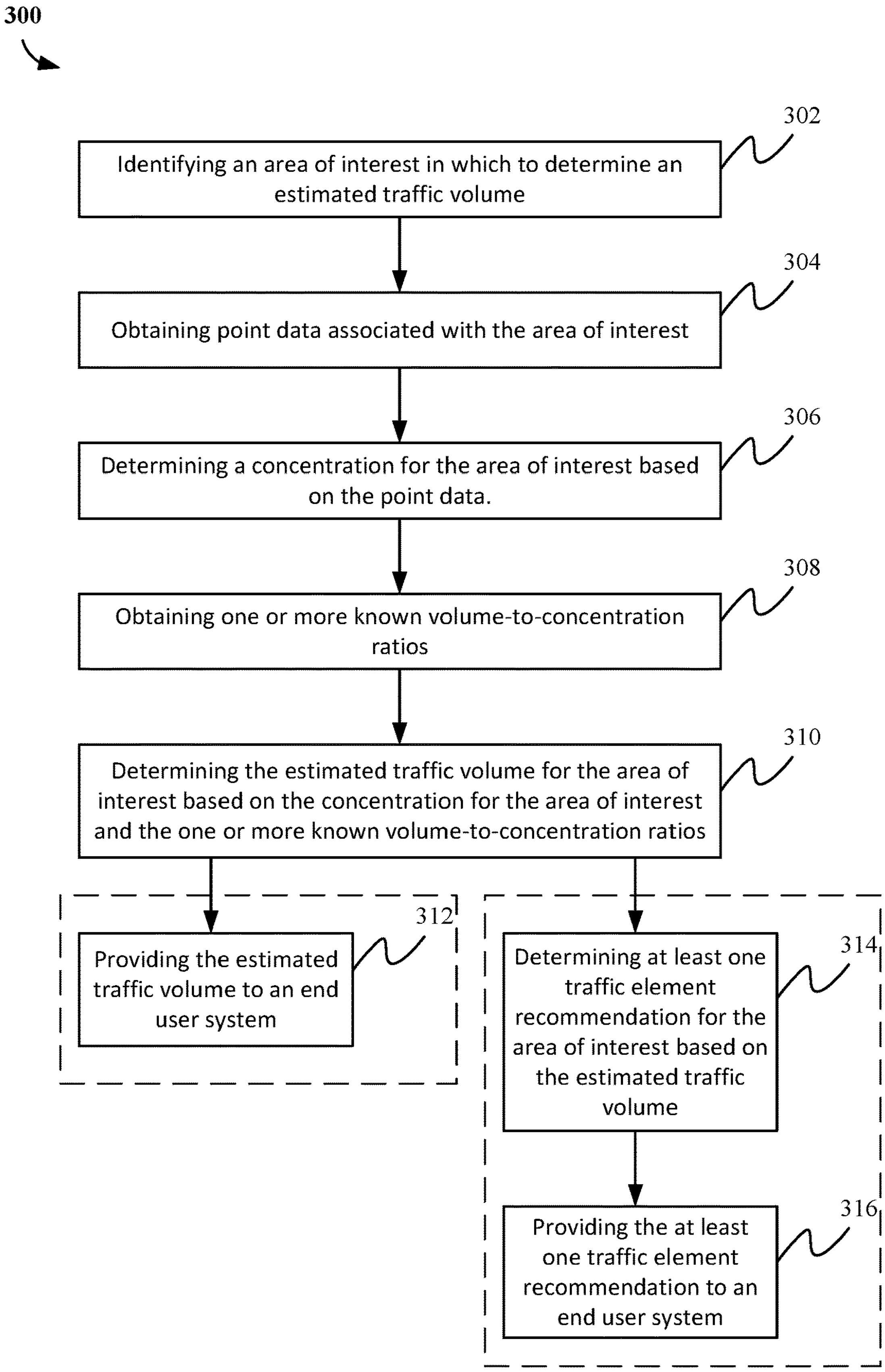
FIG. 3 illustrates a process flow diagram for estimating traffic volume using spatiotemporal point data according to an embodiment of the invention.

FIG. 3 illustrates a process flow diagram for estimating traffic volume using spatiotemporal point data according to an embodiment of the invention. Referring to FIG. 3, a traffic volume estimation system (e.g., traffic volume estimation system 205 as described with respect to FIG. 2), performing method 300, can be implemented by a traffic volume estimation server, which can be embodied with respect to computing system 400 as shown in FIG. 4.

The method 300 includes identifying (302) an area of interest in which to determine an estimated traffic volume. Identifying (302) the area of interest may include receiving at least one of a user selection of the area of interest (e.g., on a digital map) and/or an algorithmic selection of an uninterrupted road segment. For example, a user may select an area of interest on a digital map and an algorithm may be used to determine the exact cordon within the area of interest. In other cases, the user selection of the area of interest or an algorithmic selection of the area of interest may occur in isolation to identify the area of interest.

The method 300 further includes obtaining (304), via a data resource, point data associated with the area of interest. The point data includes at least spatiotemporal data and geographic information data. In some cases, the point data further includes vehicle occupancy data and/or moving speed data. In some cases, the point data further includes known traffic volumes and/or calibration factors. In some cases, the spatiotemporal data may explicitly include moving speed data. In some cases, the spatiotemporal data may not explicitly include moving speed data (in which case moving speed would need to be calculated). In some cases, the geographic information data can be used to provide a speed adjustment by multiplying moving speed by L/L, where L' is the actual length of the area of interest (accounting for vertical curves along the area of interest) and L is the horizontal distance of the area of interest. For example, in mountainous terrain, road segments are shorter on flat maps, but due to vertical slopes in the road, the road segment is actually longer than what is determined on a flat map from which the area of interest is identified. Therefore, because the number of point data records is measured for a horizontal road segment (e.g., the area of interest), the speed can be adjusted to a horizontal surface equivalent.

The method 300 further includes determining (306) a concentration for the area of interest based on the point data. In some cases, the concentration is determined (306) by multiplying data points in the area of interest by speed, a reciprocal of segment length (i.e., the length of the segment of the road of the area of interest), and a reciprocal of the vehicle occupancy rate. In some cases, the concentration is determined (306) by determining a speed distribution from moving speed data recorded by a plurality of probes within the area of interest based on the point data. In some cases, the concentration is determined (306) by determining a summation of speeds recorded by a plurality of probes within the area of interest based on the point data. In some cases, the determining the concentration can also include using vehicle occupancy rate as a denominator to reduce counting bias (e.g., when both a driver and a passenger of a vehicle have probes/devices that transmit, or store for later transfer, point data records that is collected in the point data).

The method 300 further includes obtaining (308), via the data resource, one or more known volume-to-concentration ratios. In some cases, the data resource from which the one or more known volume-to-concentration is obtained is a different data resource than the data resource from which the point data is obtained; in some cases, these data resources are the same data resource.

The method 300 further includes determining (310) the estimated traffic volume for the area of interest based on the concentration for the area of interest and the one or more known volume-to-concentration ratios. Determining (310) the estimated traffic volume for the area of interest may also include adjusting the estimated traffic volume based on vehicle occupancy rates and/or demographic variables (e.g., level of user penetration rates among a demographic versus the level of user penetration rates among the general population).

In some cases, the method 300 continues by providing (312) the estimated traffic volume to an end user system. In some cases, the method 300 continues by determining (314) at least one traffic element recommendation for the area of interest based on the estimated traffic volume. In some cases, the method 300 continues by providing (316) the at least one traffic element recommendation for the area of interest to an end user system.

In some cases, the end user system is located at a remote device and the receipt of the estimated traffic volume is received over a network. In some cases, the end user system is located at the traffic volume estimation system. In some cases, the estimated traffic volume is provided to the end user system where the estimated traffic volume is output to a display.

FIG. 4 illustrates components of an example computing system that may be used to implement certain methods and services described herein. Referring to FIG. 4, system 400 may be implemented within a single computing device or distributed across multiple computing devices or sub-systems that cooperate in executing program instructions. The system 400 can include one or more blade server devices, standalone server devices, personal computers, routers, hubs, switches, bridges, firewall devices, intrusion detection devices, mainframe computers, network-attached storage devices, and other types of computing devices. The system hardware can be configured according to any suitable computer architectures such as a Symmetric Multi-Processing (SMP) architecture or a Non-Uniform Memory Access (NUMA) architecture.

The system 400 can include a processing system 410, which may include one or more processors and/or other circuitry that retrieves and executes software 420 from storage system 430. Processing system 410 may be implemented within a single processing device but may also be distributed across multiple processing devices or sub-systems that cooperate in executing program instructions.

Storage system(s) 430 can include any computer readable storage media readable by processing system 410 and capable of storing software 420. Storage system 430 may be implemented as a single storage device but may also be implemented across multiple storage devices or sub-systems co-located or distributed relative to each other. Storage system 430 may include additional elements, such as a controller, capable of communicating with processing system 410. Storage system 430 may also include storage devices and/or sub-systems on which data is stored. System 400 may access one or more storage resources in order to access information to carry out any of the processes indicated by software 420.

Software 420, including routines for performing processes, such as method 300 for a traffic volume estimation system as described with respect to FIG. 3, may be implemented in program instructions and among other functions may, when executed by system 400 in general or processing system 410 in particular, direct the system 400 or processing system 410 to operate as described herein.

System 400 may represent any computing system on which software 420 may be staged and from where software 420 may be distributed, transported, downloaded, or otherwise provided to yet another computing system for deployment and execution, or yet additional distribution.

In embodiments where the system 400 includes multiple computing devices, the server can include one or more communications networks that facilitate communication among the computing devices. For example, the one or more communications networks can include a local or wide area network that facilitates communication among the computing devices. One or more direct communication links can be included between the computing devices. In addition, in some cases, the computing devices can be installed at geographically distributed locations. In other cases, the multiple computing devices can be installed at a single geographic location, such as a server farm or an office.

A network/communications interface 450 may be included, providing communication connections and devices that allow for communication between system 400 and other computing systems (not shown) over a communication network or collection of networks (not shown) or the air.

In some embodiments, system 400 may host one or more virtual machines.

Certain techniques set forth herein with respect to the traffic volume estimation may be described in the general context of computer-executable instructions, such as program modules, executed by one or more computing devices. Generally, program modules include routines, programs, objects, components, and data structures that perform particular tasks or implement particular abstract data types.

Alternatively. or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Certain embodiments may be implemented as a computer process, a computing system, or as an article of manufacture, such as a computer program product or computer-readable storage medium. Certain methods and processes described herein can be embodied as software, code and/or data, which may be stored on one or more storage media. Certain embodiments of the invention contemplate the use of a machine in the form of a computer system within which a set of instructions, when executed by hardware of the computer system (e.g., a processor or processing system), can cause the system to perform any one or more of the methodologies discussed above. Certain computer program products may be one or more computer-readable storage media readable by a computer system (and executable by a processing system) and encoding a computer program of instructions for executing a computer process. It should be understood that as used herein, in no case do the terms "storage media", "computer-readable storage media" or "computer-readable storage medium" consist of transitory carrier waves or propagating signals.

Discussion on Non-Analytic Method.

As described herein, the non-analytic method uses simulations with different variables (e.g., moving speed or probability distribution) to non-analytically compute statistics about concentration. The distribution of concentration can be estimated through repeated sampling (e.g., Monte Carlo simulations). Using this non-analytic method, the expected concentration for an area of interest can be solved using the equations below:

$$\kappa_{observed} = \sum\nolimits_{i=1}^{n} s_i \tag{1}$$

$$E|\kappa_{theoretical}| = E|\kappa_{observed}| = \frac{\eta v T L}{\tau} \tag{2}$$

Figure 5:
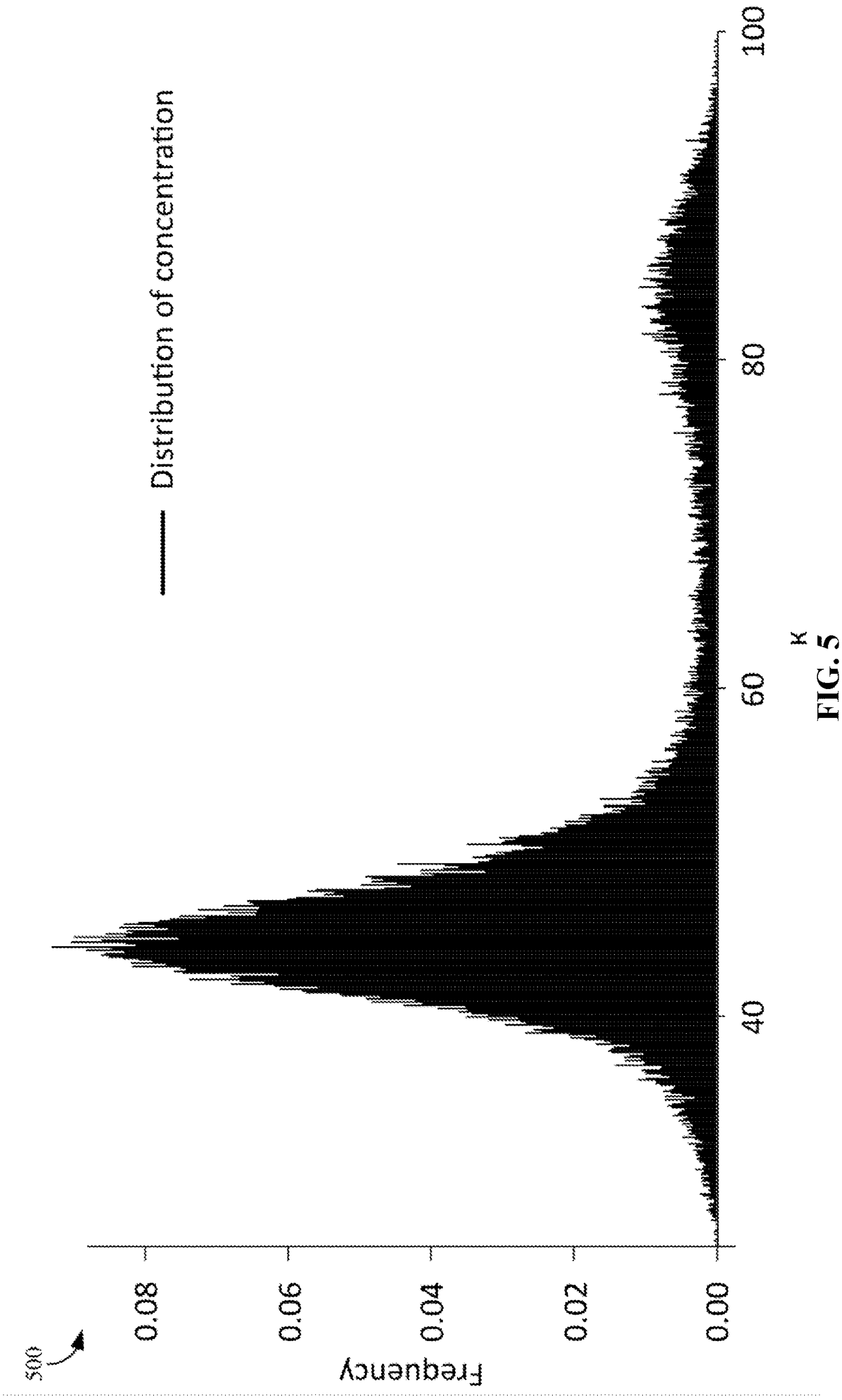
FIG. 5 illustrates a graphical output of a concentration distribution based on repeated scholastic simulations for a non-analytic method.

FIG. 5 illustrates a graphical output of a concentration distribution based on repeated scholastic simulations for a non-analytical method. Referring to FIG. 5, a graphical output 500 of a distribution of concentration is achieved, illustrating the ability to determine the concentration and therefore an estimated traffic volume for an area of interest. From the estimated concentration for the area of interest, the sample variance can be found using the following equations:

$$\mathrm{Var}[\kappa_{observed}] = \eta v T \underset{i=1}{f}(s_i, \tau, L), \text{ where} \tag{3}$$

$$f(s, \tau, L) = s^2 P(1-P); \text{ and} \tag{4}$$

$$P = \frac{L}{s\tau} \bmod 1 \tag{5}$$

It should be noted that the variance of concentration can be estimated by simulating the variance of each probe with the various speed in from equation (3) above. In some cases, using Bessel's correction (e.g., m, (m−1)), the unbiased variance can be obtained. Variance can also be determined by repeatedly sampling $\kappa_{observed}$ by sliding or repeatedly offsetting an area of interest/cordon over a segment (e.g., a sliding window method). It should be noted that the cordon geometry may vary in this method. The output of this non-analytic method yields one or more of expected concentration and/or estimated traffic volume, variance and/or standard deviation of expected concentration/estimated traffic volume, coefficient of variation of expected concentration/estimated traffic volume, distribution of expected concentration/estimated traffic volume, confidence intervals of expected concentration/estimated traffic volume, and/or optimal length (L) of the area of interest/cordon, as well as additional statistics about the distribution (e.g., percentile values, kurtosis, and/or skewness) of expected concentration/estimated traffic volume.

Discussion on Analytic Method.

As described herein, the non-analytic method uses algorithms to analytically compute statistics about concentration and/or traffic volume estimation. Using the analytic method, there are at least two ways to analytically estimate the distribution of concentration. The first way uses beta distributions and the second way uses an asymptotic normal distribution.

For example, using convoluted beta distributions (e.g., probability density function) of concentration can be computed as a series of beta distributions convoluted along the concentration axis (c-axis). Specifically, the probability density function of concentration can be found using the following equation:

$$\left[h''\left(\left\lfloor\frac{L}{s_{max}\tau}\right\rfloor, 0\right) * \ \ldots \ * h''(\infty, 0)\right] * \ \ldots \ * \left[h''(0, m) * \ \ldots \ * \right. \tag{6}$$

-continued $$\left. h''\left(\left\lfloor\frac{L}{s_{min}\tau}\right\rfloor, m\right)\right]$$

$$\text{where } h(\tilde{n}, K) = \frac{P^K(1-P)^{m-K}}{B(K+1, m-K+1)}; \text{ and} \tag{7}$$

$$h'(\tilde{n}, K) = \int_{a(\tilde{n})}^{b(\tilde{n})} g(s) h(\tilde{n}, K) ds$$

It should be noted that h"ñ, K) is equal to the integrated density function of h'(ñ, K) projected onto x-axis, and g(s) is equal to the probability density function of speed.

Figure 6:
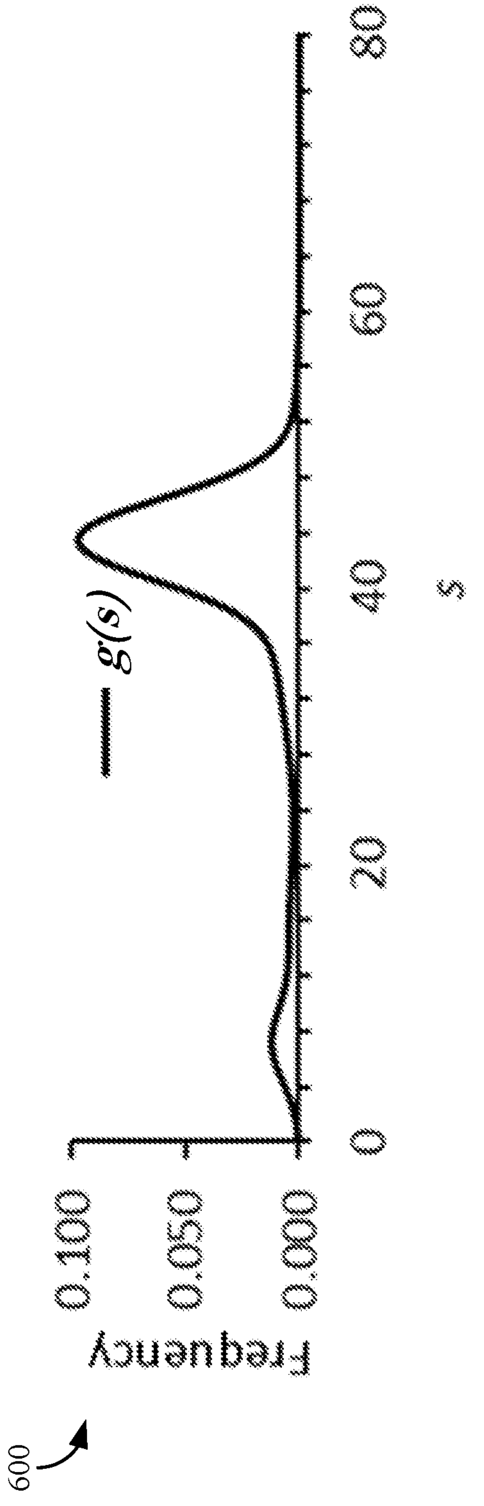
FIG. 6 illustrates a graphical output of a probability density function of speed at a segment for an analytical method.

FIG. 6 illustrates a graphical output of a probability density function of speed at a segment for an analytical method. Referring to FIG. 6, graphical output 600 of the probability density function of speed at a segment.

Figure 7:
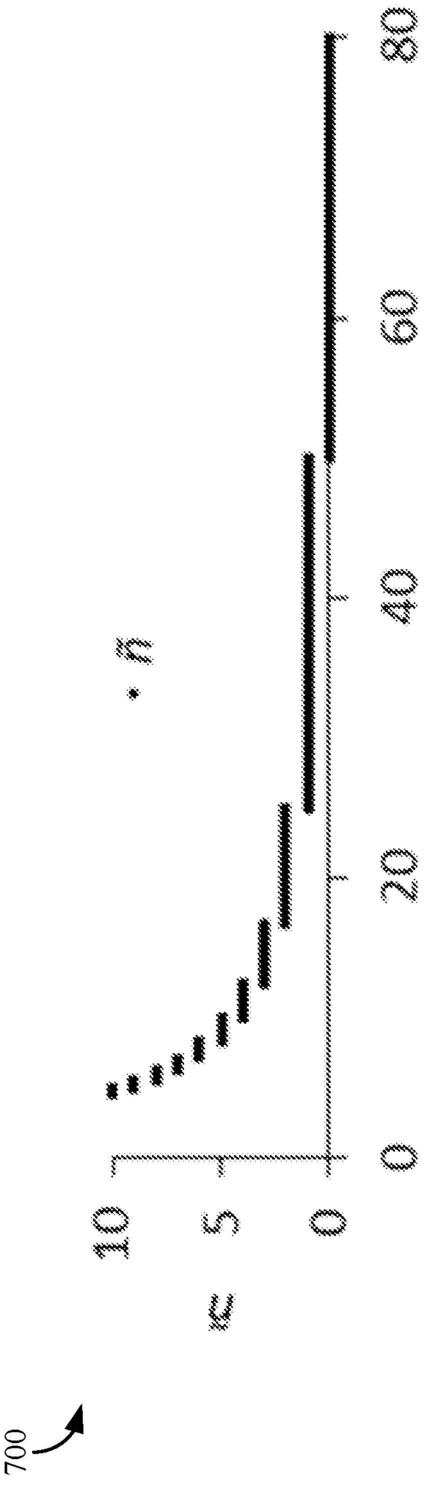
FIG. 7 illustrates a plot of a minimum number of observed records as a function of speed for an analytical method.

FIG. 7 illustrates a plot of a minimum number of observed records as a function of speed for an analytical method when L=100 meters. τ=2 seconds, η=0.02 of road users or units of mobility are probes, and T=50 days. Referring to FIG. 7, a plot 700 if space-mean speed or time-mean speed associated with records and/or probes (s) becomes larger, the minimum number of observed records (h) as a function of speed illustrates that as ñ becomes smaller.

Figure 8:
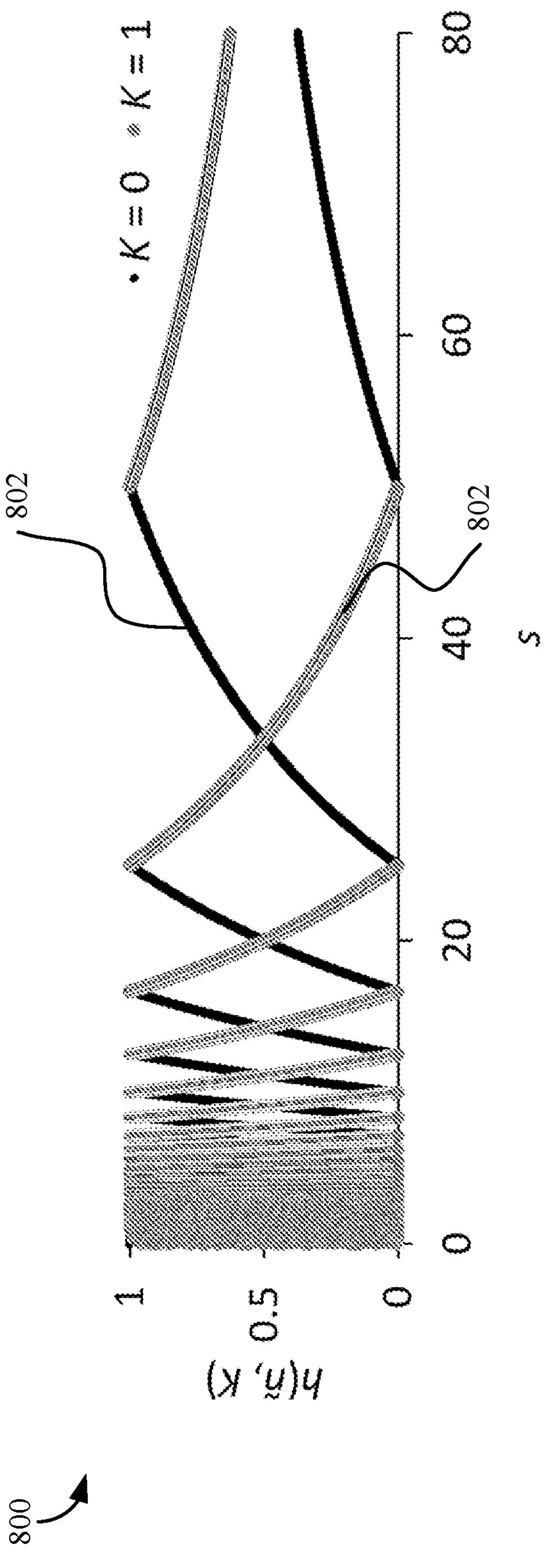
FIG. 8 illustrates a graphical output of probability mass of a binomial distribution for an analytical method.

FIG. 8 illustrates a graphical output of probability mass of a binomial distribution for an analytical method. Referring to FIG. 8, the graphical output 800 of concentration of speed is illustrated using 1 as the total number of probes passing through the area of interest (m). Therefore, the total number of records is $\tilde{n}_i$+K where K is 0 or 1 (e.g., because the probe may or may not be recorded while within the area of interest depending on the length of the area of interest, time interval between recordings, and the moving speed of the probe through the area of interest. For example, when L=100, $s_i$=40, and τ=2, $\tilde{n}_i$=⌊100/80⌋=1 and 100/80=1.25, the number of records ñ+K becomes 1 at the probability of 0.75 (P=0.75) and becomes 2 at the probability of 0.25 (P=0.25).

Specifically, the graphical output 800 illustrates the probability of each K as a function of speed illustrated as a series of beta distributions. Using the probability density function of the beta distributions (h(ñ, K)), because ñ is a function of s, h(ñ, K) is essentially a function of s and K. When L and r are the same across probes, P is determined by s.

Figure 9:
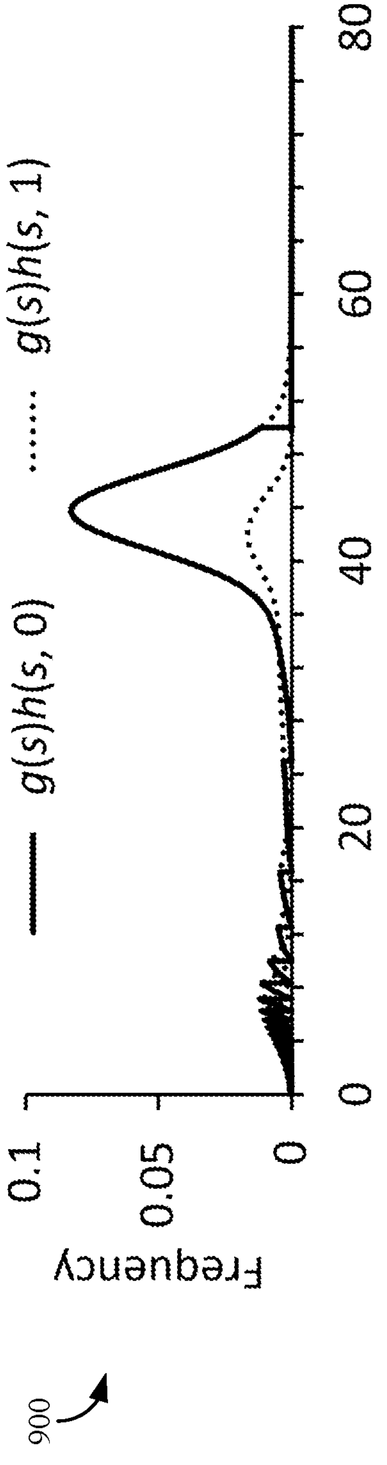
FIG. 9 illustrates a graphical output of probability mass of a binomial distribution weighted by corresponding probability mass function or probability density function of s for an analytical method.
Figure 10:
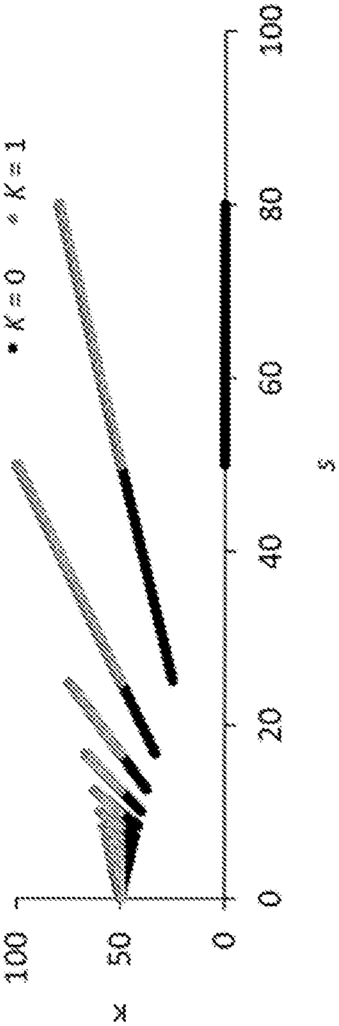
FIG. 10 illustrates a graphical output of a scaling of beta distributions of FIG. 8 as a function of speed before convolution as a function of concentration for an analytical method.

When solving for the probability against all occurrences, using the speed distribution for this example (e.g., graphical output 600 of FIG. 6), the lines 802 in FIG. 8 can be weighted. The result is illustrated in FIG. 9. FIG. 9 illustrates a graphical output 900 of probability mass of a binomial distribution weighted by corresponding probability mass function or probability density function of s for an analytical method. Here, g(s)h(40, 0) is 0.0561 and h(40, 1) is 0.0158. FIG. 10 illustrates a graphical output 1000 of a scaling of beta distributions of FIG. 8 as a function of speed before convolution as a function of concentration for an analytical method.

Figure 11:
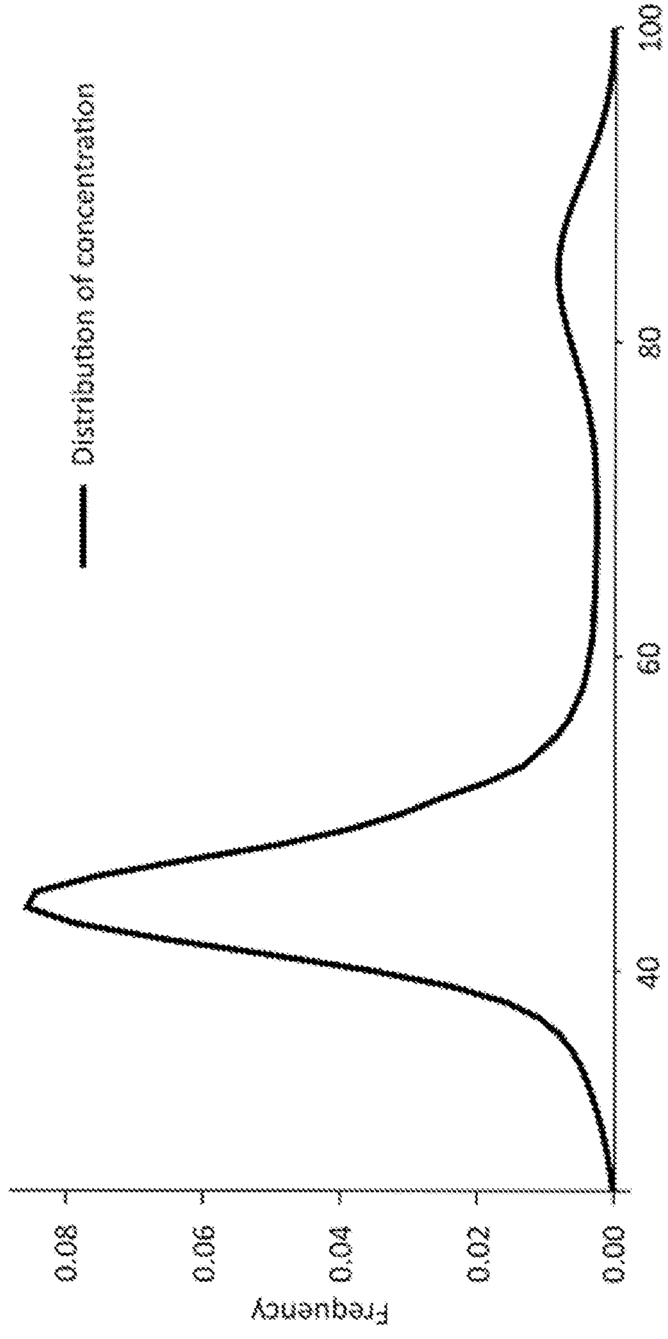
FIG. 11 illustrates a graphical output that is proportional to the probability density function of concentration for an analytical method.

Because concentration from each probe is calculated in the form of κ=s(ñ+K), the density that corresponds to a set of f and K (e.g., as illustrated in graphical output 900 of FIG. 9), can be further scaled by speed and convoluted as a function of κ as illustrated in FIG. 11. FIG. 11 illustrates a graphical output 1100 that is proportional to the probability density function of concentration for an analytical method. The output of this analytic method yields one or more of expected concentration and/or estimated traffic volume, variance and/or standard deviation of expected concentration/estimated traffic volume, coefficient of variation of expected concentration/estimated traffic volume, distribution of expected concentration/estimated traffic volume, confidence intervals of expected concentration/estimated traffic volume, and/or optimal length (L) of the area of interest/cordon, as well as additional statistics about the distribution (e.g., percentile values, kurtosis, and/or skewness) of expected concentration/estimated traffic volume. It should be noted that the distribution in FIG. 11 is identical to the distribution illustrated in FIG. 5.

As another example, normal approximation can be used when enough probes are observed. The distribution of concentration asymptotically becomes a normal distribution as follows:

$$E[\kappa_{theoretical}] \to N\left(\frac{\eta v T L}{\tau}, \eta v T \int_0^\infty f(s, \tau, L) g(s) ds\right) \quad (9)$$

Using the expected value equation $$E[\kappa_{theoretical}] = E[\kappa_{observed}] = \frac{\eta v T L}{\tau},$$

the variance can be determined using the following equation:

$$\mathrm{Var}[\kappa_{theoretical}] = \eta v T \int_0^\infty f(s, \tau, L) g(s) ds, \text{ where} \quad (10)$$

$$f(s, \tau, L) = s^2 P(1-P) \text{ and } P = \frac{L}{s\tau} \bmod 1.$$

The output of this analytic method yields one or more of expected concentration and/or estimated traffic volume, variance and/or standard deviation of expected concentration/estimated traffic volume, coefficient of variation of expected concentration/estimated traffic volume, distribution of expected concentration/estimated traffic volume, confidence intervals of expected concentration/estimated traffic volume, and/or optimal length (L) of the area of interest/cordon, as well as additional statistics about the distribution (e.g., percentile values, kurtosis, and/or skewness) of expected concentration/estimated traffic volume.

For either the analytical or the non-analytical method, an optimal length ($L_{optimal}$) of the area of interest/cordon can also be determined. For example, depending on $L_{max}$ (e.g., the length of the area of interest that is selected by the user/algorithm), there is an optimal length that minimizes a value for at least one of the variance, the standard deviation, the variance-to-mean ratio and the coefficient-of-variation. For example, using a range for a length of the area of interest, (e.g., $0 < L_{optimal} \leq L_{max}$), a system can repeatedly compute at least one of the variance, the standard deviation, the variance-to-mean ratio and the coefficient-of-variation to seek the optimal value of L ($L_{optimal}$) that minimizes the at least one of the variance, the standard deviation, the variance-to-mean ratio and the coefficient-of-variation. For example, the equation: $\mathrm{argmin}_{i, \in [0, L_{max}]} \mathrm{obj}(L)$ can be used, where obj(L) is an objective function given the other variables. Specifically, $\mathrm{obj}(L) = \mathrm{Var}[\kappa]/E[\kappa]$ or $\mathrm{obj}(L) = \sqrt{\mathrm{Var}[\kappa]}/E[\kappa]$ can be used given those variables. It should also be noted that $\eta v T$ can be replaced with m if necessary.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

What is claimed is:

1. A system comprising:

a processing system;

a storage system; and instructions stored on the storage system that when executed by the processing system direct the processing system to at least:

identify an area of interest in which to determine an estimated traffic volume;

obtain, via a data resource, data associated with the area of interest, the data comprising at least spatiotemporal data and geographic information data;

determine a concentration of the area of interest based on the data, wherein the concentration of the area of interest is a number that is proportional to an estimated number of probes, which asymptotically approaches a true number of probes, wherein the true number of probes is unknown because pseudonyms associated with each of the probes are not available, and wherein the spatiotemporal data is anonymized, wherein the concentration of the area of interest includes a summation of moving speeds obtained from the data associated with the area of interest, and wherein the concentration for the area of interest is used for estimating the number of probes and thereby in place of the true number of probes in determining the estimated traffic volume;

obtain, via the data resource, one or more known volume-to-concentration ratios, wherein each known volume-to-concentration ratio represents a relationship between a known traffic volume at a location and a known concentration of probe data determined for that location;

determine the estimated traffic volume for the area of interest based on the concentration of the area of interest and the one or more known volume-to-concentration ratios;

determine at least one traffic element recommendation for the area of interest based on the estimated traffic volume; and provide the at least one traffic element recommendation for the area of interest to an end user.

2. The system of claim 1, wherein the instructions directing the processing system to determine the concentration of the area of interest based on the data comprise instructions that direct the processing system to:

determine, from the data associated with the area of interest, at least one of a variance, a standard deviation, a variance-to-mean ratio and a coefficient of variation; and determine an optimal cordon length within the area of interest based on a minimized value of the at least one of the variance, the standard deviation, the variance-to-mean ratio and the coefficient of variation.

3. The system of claim 1, wherein the instructions directing the processing system to identify the area of interest comprise instructions that direct the processing system to receive at least one of a user selection of the area of interest on a digital map and an algorithmic selection of an uninterrupted road segment.

4. The system of claim 1, wherein the at least one traffic element recommendation is at least one of a transportation engineering solution and a zoning recommendation.

5. The system of claim 1, wherein the instructions further direct the processing system to:

collect, via a data collection system, the data associated with the area of interest from a plurality of probes; and store, in the data resource, the data associated with the area of interest.

6. The system of claim 1, wherein the instructions directing the processing system to determine the concentration for the area of interest based on the data comprise instructions that direct the processing system to determine a summation of speeds recorded by a plurality of probes within the area of interest based on the data, wherein the summation of speeds from each recorded data captured within the area of interest in a time period corresponds to the concentration and is proportional to the true number of probes.

7. The system of claim 1, wherein the instructions directing the processing system to determine the concentration for the area of interest based on the data comprise instructions that direct the processing system to determine a speed distribution from moving speed data recorded by a plurality of probes within the area of interest based on the data, wherein the speed distribution from the moving speed data from each recorded data captured within the area of interest in a time period corresponds to the concentration and is proportional to the true number of probes.

8. A method comprising:

identifying an area of interest in which to determine an estimated traffic volume;

obtaining, via a data resource, data associated with the area of interest, the data comprising at least spatiotemporal data and geographic information data;

determining a concentration of the area of interest based on the data, wherein the concentration of the area of interest includes a summation of moving speeds obtained from the data associated with the area of interest and is a number that is proportional to an estimated number of probes, which asymptotically approaches a true number of probes, wherein the true number of probes is unknown because pseudonyms associated with each of the probes are not available, and wherein the spatiotemporal data is anonymized;

obtaining, via the data resource, one or more known volume-to-concentration ratios, wherein each known volume-to-concentration ratio represents a relationship between a known traffic volume at a location and a known concentration of probe data determined for that location;

determining the estimated traffic volume for the area of interest based the concentration of the area of interest and the one or more known volume-to-concentration ratios, the concentration for the area of interest being used for estimating the number of probes and thereby in place of the true number of probes in determining the estimated traffic volume; and determining at least one traffic element recommendation for the area of interest based on the estimated traffic volume.

9. The method of claim 8, wherein determining the concentration of the area of interest based on the data comprises:

determining, from the data associated with the area of interest, at least one of a variance, a standard deviation, a variance-to-mean ratio and a coefficient of variation; and determining an optimal cordon length within the area of interest based on a minimized value of the at least one of the variance, the standard deviation, the variance-to-mean ratio and the coefficient of variation.

10. The method of claim 8, wherein identifying the area of interest comprises at least one of receiving a user selection of the area of interest on a digital map and receiving an algorithmic selection of an uninterrupted road segment.

11. The method of claim 8, wherein the data further comprises vehicle occupancy data.

12. The method of claim 8, further comprising providing the at least one traffic element recommendation for the area of interest based on the estimated traffic volume to an end user.

13. The method of claim 8, wherein the at least one traffic element recommendation is at least one of a transportation engineering solution and a zoning recommendation.

14. The method of claim 8, further comprising:

collecting, via a data collection system, the data associated with the area of interest from a plurality of probes; and storing, in the data resource, the data associated with the area of interest.

15. The method of claim 8, wherein determining the concentration for the area of interest based on the data comprises determining a summation of speeds recorded by a plurality of probes within the area of interest based on the data, wherein the summation of speeds from each recorded data captured within the area of interest in a time period corresponds to the concentration and is proportional to the true number of probes.

16. The method of claim 8, wherein determining the concentration for the area of interest based on the data comprises determining a speed distribution from moving speed data recorded by a plurality of probes within the area of interest based on the data, wherein the speed distribution from the moving speed data from each recorded data captured within the area of interest in a time period corresponds to the concentration and is proportional to the true number of probes.

17. A non-transitory computer-readable storage medium having instructions stored thereon that, when executed by a processing system, perform a method comprising:

obtaining, via a data resource, data associated with an area of interest regarding an estimated traffic volume, the data comprising at least spatiotemporal data and geographic information data;

determining a concentration for the area of interest based on the data, wherein the concentration of the area of interest includes a summation of moving speeds obtained from the data associated with the area of interest and is a number that is proportional to an estimated number of probes, which asymptotically approaches a true number of probes, wherein the true number of probes is unknown because pseudonyms associated with each of the probes are not available, and wherein the spatiotemporal data is anonymized;

obtaining, via the data resource, one or more known volume-to-concentration ratios, wherein each known volume-to-concentration ratio represents a relationship between a known traffic volume at a location and a known concentration of probe data determined for that location, the concentration for the area of interest being used for estimating the number of probes and thereby in place of the true number of probes in determining the estimated traffic volume; and determining the estimated traffic volume for the area of interest based on the concentration of the area of interest and the one or more known volume-to-concentration ratios.

18. The computer-readable storage medium of claim 17, wherein the instructions further comprise instructions for identifying the area of interest in which to determine the estimated traffic volume.

19. The computer-readable storage medium of claim 18, wherein the instructions for identifying the area of interest comprise instructions for receiving at least one of a user selection of the area of interest on a digital map and an algorithmic selection of an uninterrupted road segment.

20. The computer-readable storage medium of claim 17, wherein the instructions for determining the concentration for the area of interest based on the data comprise instructions for:

determining, from the data associated with the area of interest, at least one of a variance, a standard deviation, a variance-to-mean ratio and a coefficient of variation; and determining an optimal cordon length within the area of interest based on a minimized value of the at least one of the variance, the standard deviation, the variance-to-mean ratio and the coefficient of variation.

21. The computer-readable storage medium of claim 17, wherein the data further comprises vehicle occupancy data.

22. The computer-readable storage medium of claim 17, wherein the instructions further comprise instructions for determining at least one traffic element recommendation for the area of interest based on the estimated traffic volume.

23. The computer-readable storage medium of claim 22, wherein the instructions further comprise instructions for providing the at least one traffic element recommendation for the area of interest based on the estimated traffic volume to an end user.

24. The computer-readable storage medium of claim 22, wherein the at least one traffic element recommendation is at least one of a transportation engineering solution and a zoning recommendation.

25. The computer-readable storage medium of claim 17, wherein the instructions further comprise instructions for:

collecting, via a data collection system, the data associated with the area of interest from a plurality of probes; and storing, in the data resource, the data associated with the area of interest.

26. The computer-readable storage medium of claim 17, wherein the instructions for determining the concentration for the area of interest based on the data comprise instructions for determining a summation of speeds recorded by a plurality of probes within the area of interest based on the data, wherein the summation of speeds from each recorded data captured within the area of interest in a time period corresponds to the concentration and is proportional to the true number of probes.

27. The computer-readable storage medium of claim 17, wherein the instructions for determining the concentration for the area of interest based on the data comprise instructions for determining a speed distribution from moving speed data recorded by a plurality of probes within the area of interest based on the data, wherein the speed distribution from the moving speed data from each recorded data captured within the area of interest in a time period corresponds to the concentration and is proportional to the true number of probes.

28. The system of claim 1, wherein the data resource comprises a plurality of data resources, and wherein the spatiotemporal data is obtained at a specific interval via transmissions from at least one of the plurality of data resources.

* * * * *